June 19, 1934.  S. L. INGERSOLL ET AL  1,963,745
PROCESS FOR MAKING COMPOSITE METAL ARTICLES
Filed July 5, 1932
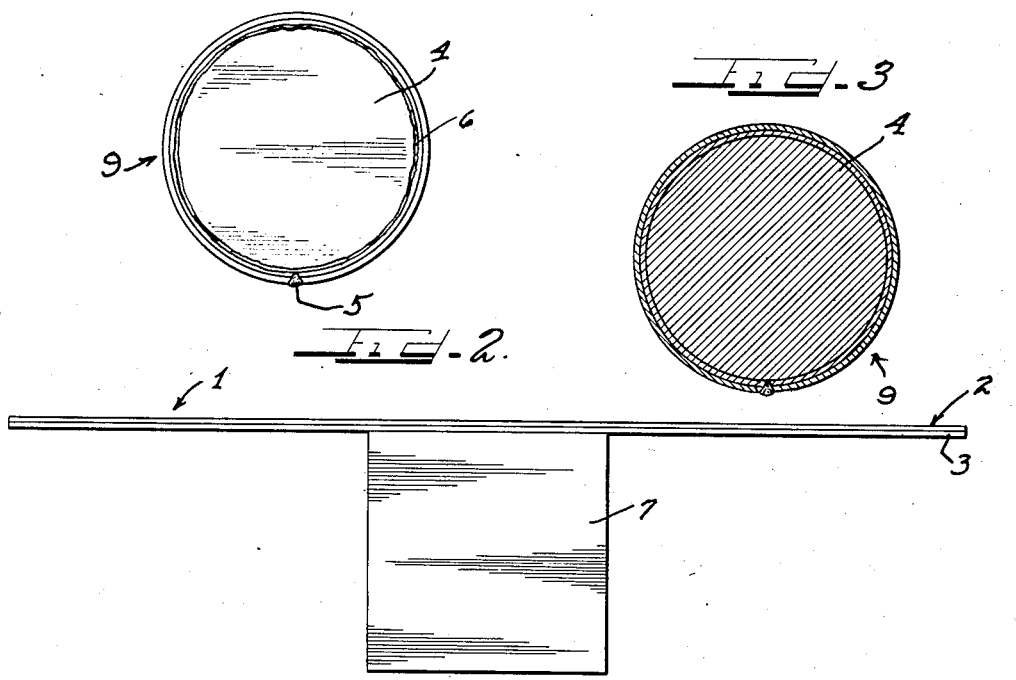
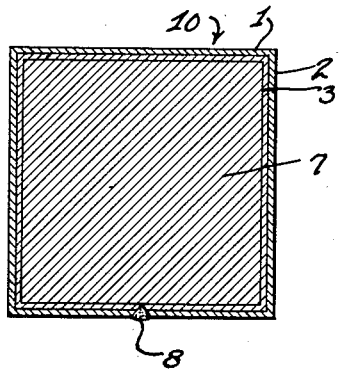
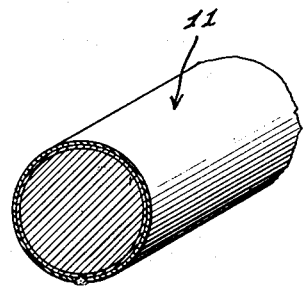
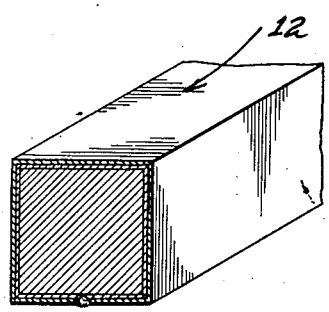
Inventors
Stephen L. Ingersoll.
Alton C. Borg.
Wilbur W. Patrick.
by Charles M. Mills Attys.

Patented June 19, 1934

1,963,745

UNITED STATES PATENT OFFICE 1,963,745

PROCESS OF MAKING COMPOSITE METAL ARTICLES

Stephen L. Ingersoll, Chicago, Ill., and Wilbur W. Patrick and Alton C. Borg, New Castle, Ind., assignors to Ingersoll Steel and Disc Co., Chicago, Ill., a corporation of Illinois Application July 5, 1932, Serial No. 620,750

5 Claims. (Cl. 29—188)

This invention relates to a method of making composite metal articles and particularly to a method of making metal bars or rods having a stable surface alloy sheath or surface.

It has heretofore been proposed to make articles having a body of one metal and a coating or surface layer of a different metal or alloy by casting the latter metal or alloy about a core of another metal. While such a process has been found satisfactory in some instances, as in the forming of composite metallic articles from non-ferrous metals, the prior art methods are not very satisfactory for providing a steel core with a surface coating of a stable surface alloy, such as stainless steel.

Due to the difficulty experienced in welding an alloy such as stainless steel directly to ordinary steel such as low carbon steel, it is highly desirable that the surfaces to be welded together be metals of good welding properties. The present invention overcomes these difficulties by employing a previously made and firmly united two-ply metallic sheet, one side of which is stainless steel or other stable surface alloy and the opposite side of which is formed of steel or metal of good welding properties. A shell of this composite sheet with the stainless steel or other stable alloy on the outside is then formed around a steel core, the core with the sheet formed therearound is then heated to a proper rolling temperature and the billet formed by the core and sheet is subjected to desired rolling processes during which the inner layer of the shell, which is, as previously stated, of a metal having good welding properties, is firmly welded and united to the steel core.

In carrying out the process of this invention, a previously formed composite metallic plate having an outer layer of stable alloy and an inner layer of steel firmly bonded thereto is wrapped about a metallic core and hot rolled after the adjacent end and side edges have been welded.

Accordingly, it is an object of this invention to provide an article having a steel core and an outer surface of stable alloy by a method which insures a satisfactory bond between the metals.

It is a particular object of this invention to provide a method of forming a metal article having an outer sheath or coating of stainless steel by welding a composite metal shell having an outer layer of stainless steel and an inner layer of a metal having good welding properties about a steel core and perfecting the bond by a subsequent rolling operation.

These and other objects of this invention will be apparent from the following description and appended claims.

This invention (in a preferred form) is illustrated in the accompanying drawing and hereinafter more fully described.

On the drawing:

Figure 1 is an end view of a metallic core having a composite metallic sheet wrapped therearound with the abutting edges and adjacent end edges of the layers welded.

Figure 2 is an end view of a core of different shape showing a metallic sheet applied thereto previous to wrapping.

Figure 3 is a cross-sectional view of the core of Figure 1 with the metallic sheet thereabout.

Figure 4 is a cross-sectional view of the core of Figure 2 with the metallic sheet thereabout.

Figure 5 is a cross-sectional view of a rod formed by the rolling operation.

Figure 6 is a cross-sectional view of a slightly modified form of rod.

As shown on the drawing:

In carrying out this invention, a composite metallic sheet 1 is provided. The sheet 1 has an outer layer 2 of a suitable stable alloy, such as stainless steel, firmly bonded to an inner layer 3. Steel having 18% chromium and 8% nickel is preferred but satisfactory results have been obtained with 20% chromium and 10% nickel steel as well as steel having 25% chromium and 12% nickel. In general, steels having from 10 to 30% chromium and 0–15% nickel may be used. The inner layer 3 is preferably an alloy steel suitable for heat treating. The composite sheet 1 may be formed in any manner, but is preferably formed by the process set out in a patent to Stephen L. Ingersoll No. 1,868,749, dated July 26, 1932, and entitled "Process of making laminated metal".

The composite sheet 1 is wrapped around a steel core 4, the contacting surfaces of the sheet and core having been previously pickled and thoroughly cleaned. This may be accomplished by any suitable method, and after the sheet 1 has been wrapped around core 4, the abutting edges of the sheet 1 are welded as shown at 5, and when stainless steel is used for the outer layer the welding is accomplished by the use of an electric arc or acetylene arc and in this operation, a welding rod of stainless steel is used.

The adjacent end edges of the composite sheet 1 are also welded as shown at 6.

In a similar way, a composite metal sheet, such as the sheet 1, may be wrapped around a rectangular core 7 as shown in Figure 2, the abutting edges being welded as shown at 8 in Figure 3.

It will be understood that cores of various shapes, such as hexagonal or octagonal may be used, but only cylindrical and rectangular prism bars have been illustrated.

The blanks 9 and 10 thus formed are heated to forging temperature and passed one or more times through forming rolls to form the rods 11 and 12 of Figures 5 and 6, respectively. In forming the rod 12, the blank 10 is passed through rolls as in the customary way of rolling rounds and bars. It will be understood that in like manner, a blank of any polygonal cross-section can be reduced to a rod having the same or any desired general shape. A cylindrical rod or bar 11 can be readily formed from a blank of rectangular cross-section as shown at 10.

As previously stated, the outer layer 2 of the sheet 1 is formed of some stable alloy, such as stainless steel, and the inner layer 3 is formed of a suitable steel. The particular composition of the steel used for the layer 3 and cores 4 or 7 is not material to the invention except that as a practical expedient it has been found that the process can be carried out more successfully when the layer 3 and cores 4 or 7 are formed of steels of similar analyses. Nevertheless, where a high carbon steel having from .90 per cent to 1.20 per cent carbon is used as the core metal, it has been found satisfactory to use a low carbon steel as the core 3. Thus, there is little or no migration of the carbon toward the stainless steel, as would be the case if a stainless steel were to be wrapped directly about the cores 4 or 7. When such metals are used, they are heated to a temperature of approximately 2200° to 2500° F. previous to rolling.

The thickness of the sheet 1 is many times less than the diameter of the core and as the blank is greatly reduced in the rolling process, the stainless steel layer forms a very thin but impervious coating.

A particular advantage of this invention arises from the use of similar steels for the layer 3 and cores 4 or 7, as there is not a sufficient difference in the coefficients of expansion to cause the metals to draw apart upon cooling. The welding of the metals previous to the rolling process prevents access to the surfaces to be welded of the atmosphere or gases of the furnace. Consequently, in the subsequent rolling of the composite blank the metal of the outer sheet is firmly and securely bonded to the inner core, and in fact the inner layer 3 of the sheet and the core metal appear as a single metal with an outer coating of a stable surface alloy.

In the manufacture of articles by this process, it has been found that the blanks can be rolled and reduced until the outer layer of metal 2 is just a thin coating. The invention has proved practical in the manufacture of such articles as bumper bars for automobiles, piston rods, deep well shafting, pump shafts and the like.

We are aware that many changes may be made and numerous details may be varied through a wide range without departing from the principles of this invention, and we, therefore, do not purpose limiting the patent granted herein otherwise than necessitated by the prior art.

We claim as our invention:

1. The method of forming a metallic article having a continuous surface of a stable surface alloy, which comprises wrapping a composite metallic sheet, having an outer layer of the stable surface alloy and an inner layer of steel bonded thereto, about a steel core, sealing the adjacent edges and hot rolling the composite blank thus formed to reduce its size and to firmly bond said inner layer to said core.

2. The method of forming a metal article having an outer coating of stainless steel, which comprises wrapping a composite metallic sheet about a steel core, said sheet having an outer layer of stainless steel and an inner layer of steel similar to the core metal bonded to the outer layer, welding the adjacent end edges and hot rolling the blank thus formed to reduce its size and to firmly bond the metals.

3. The method of forming a metal article having an outer coating of stainless steel, which comprises wrapping a composite metallic sheet having an outer layer of stainless steel and an inner layer of mild steel about a core of mild steel, welding the abutting edges of the sheet and adjacent end edges of the sheet and core with stainless steel and hot rolling the blank thus formed to reduce its size and to firmly bond the metals.

4. The method of forming a metallic article having an outer coating of stainless steel, which comprises wrapping a composite metallic sheet having an outer layer of stainless steel and an inner layer of mild steel bonded thereto about a core of mild steel, said sheet having its abutting edges beveled so as to form a V-shaped trough extending lengthwise of the core, filling said trough with stainless steel, welding the adjacent end edges of the core and sheet and hot rolling the blank thus formed to reduce its size and to firmly bond the metals.

5. The method of forming a composite metal article having a continuous outer lamination of a stable surface alloy, which comprises wrapping a composite metallic sheet having an outer layer of the stable surface alloy and an inner layer of a ferrous metal bonded thereto, about a ferrous metal core of similar composition to the inner layer of the sheet, said composite sheet having its abutting edges beveled so as to form a V-shaped trough extending lengthwise of the core, filling said trough with the surface alloy, welding the adjacent end edges of the core and sheet and hot rolling the blank thus formed to reduce its size and to firmly bond the inner layer to the core.

STEPHEN L. INGERSOLL.
WILBUR W. PATRICK.
ALTON C. BORG.